(12) United States Patent
Usui et al.

(10) Patent No.: US 7,095,463 B2
(45) Date of Patent: Aug. 22, 2006

(54) ULTRAVIOLET RAY EMITTING APPARATUS AND ELECTRONIC APPARATUS USING ULTRAVIOLET RAY EMITTING ELEMENTS

(75) Inventors: Norihisa Usui, Higashiyamato (JP); Tadao Hirano, Akiruno (JP); Masato Ueno, Hachioji (JP); Shyuichi Machida, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 10/218,132

(22) Filed: Aug. 13, 2002

(65) Prior Publication Data

US 2003/0042847 A1   Mar. 6, 2003

(30) Foreign Application Priority Data

Aug. 31, 2001   (JP)   ............................. 2001-263599

(51) Int. Cl.
G02F 1/1335   (2006.01)
(52) U.S. Cl. ..................... 349/61; 362/29; 362/30; 362/84; 362/103
(58) Field of Classification Search ............... 349/61, 349/69, 64, 118, 106, 112, 12, 110; 313/486, 313/586, 461, 463; 345/173, 175, 176, 183, 345/156; 368/223–228, 67, 88; 362/29–30, 362/84, 103; 257/72, 431, 440
See application file for complete search history.

(56) References Cited

U.S. PATENT DOCUMENTS

| | | | |
|---|---|---|---|
| 4,705,407 A | | 11/1987 | Brien |
| 4,740,781 A | * | 4/1988 | Brown .................. 345/174 |
| 5,604,716 A | | 2/1997 | Cheung |
| 5,612,803 A | * | 3/1997 | Yamada et al. ............ 349/188 |
| 5,751,382 A | * | 5/1998 | Yamada et al. ............ 349/12 |
| 5,923,319 A | * | 7/1999 | Bishop et al. ............. 345/175 |
| 5,995,456 A | * | 11/1999 | Brewer et al. ............. 368/84 |
| 6,025,894 A | * | 2/2000 | Shirasaki et al. ........... 349/69 |
| 6,088,069 A | * | 7/2000 | Farlow .................... 349/12 |
| 6,091,382 A | * | 7/2000 | Shioya et al. ............. 345/76 |
| 6,091,838 A | * | 7/2000 | Burrows et al. ........... 382/124 |
| 6,092,904 A | * | 7/2000 | Tai et al. ................. 362/31 |
| 6,172,667 B1 | * | 1/2001 | Sayag ..................... 345/175 |
| 6,181,062 B1 | * | 1/2001 | Hiraishi et al. ........... 313/504 |
| 6,191,833 B1 | * | 2/2001 | Hirakata .................. 349/61 |
| 6,208,591 B1 | * | 3/2001 | Sakurazawa et al. ........ 368/67 |
| 6,218,774 B1 | * | 4/2001 | Pope ...................... 313/461 |
| 6,266,297 B1 | * | 7/2001 | Sonoda et al. ............ 368/67 |
| 6,295,106 B1 | * | 9/2001 | Fukuzawa et al. ......... 349/71 |
| 6,295,110 B1 | * | 9/2001 | Ohe et al. ................ 349/124 |
| 6,333,724 B1 | * | 12/2001 | Taira et al. ............... 345/5 |
| 6,466,522 B1 | * | 10/2002 | Yoshioka et al. .......... 368/223 |
| 6,486,561 B1 | * | 11/2002 | Fuwausa et al. ........... 257/777 |
| 6,512,721 B1 | * | 1/2003 | Amano et al. ............. 368/67 |
| 6,606,399 B1 | * | 8/2003 | Burrows et al. ........... 382/124 |
| 6,661,481 B1 | * | 12/2003 | Suzuki .................... 349/73 |
| 6,729,738 B1 | * | 5/2004 | Fuwausa et al. ........... 362/84 |
| 6,753,068 B1 | * | 6/2004 | Nakamura et al. ......... 428/172 |

(Continued)

FOREIGN PATENT DOCUMENTS

JP   09-264969 A   7/1987

(Continued)

*Primary Examiner*—Karl D. Frech
*Assistant Examiner*—Edwyn Labaze

(57) ABSTRACT

A display emitting apparatus that irradiates an optically transparent display unit with Ultraviolet rays of light from below to cause luminescent layers provided on the display unit to emit colored rays of light to provide a highly colorful and very ornamental display (FIG. 1).

2 Claims, 14 Drawing Sheets

U.S. PATENT DOCUMENTS 6,806,644 B1 * 10/2004 Ueno et al. .................. 313/512

FOREIGN PATENT DOCUMENTS

| JP | 09-264969 | 7/1997 |
| JP | 09-264969 | 10/1997 |
| JP | 11-278151 | 12/1999 |
| JP | 2000-137444 A | 5/2000 |
| JP | 2000356964 A * | 12/2000 |

* cited by examiner

ULTRAVIOLET RAY EMITTING APPARATUS AND ELECTRONIC APPARATUS USING ULTRAVIOLET RAY EMITTING ELEMENTS

BACKGROUND OF THE INVENTION

1. Field of the Invention

The present invention relates to UV (Ultraviolet) ray emitting apparatus and electronic apparatus employing UV ray emitting elements for use in wrist watches, portable telephones and carmeters.

2. Background Art

Some wristwatches have parts such as faces and hands covered partially, for example, by printing with a light-energy storage paint such as a luminous paint. The light-energy storage paint receives external light in a bright place to store corresponding energy and emits as light the stored energy in a dark place.

According to such wristwatches, we can know a present time in a dark place since the light-energy storage paint emits light based on the stored energy. However, we cannot cause the paint to emit light whenever we desire. Furthermore, since the paint only emits light the wristwatches can not provide highly colorful and sufficiently ornamental effects.

SUMMERY OF THE INVENTION

It is therefore an object of the present invention to provide UV ray emitting apparatus and electronic apparatus that cause luminescent layers to emit corresponding colored rays of light to thereby provide a highly colorful and very ornamental display.

Another object of the present invention is to provide UV ray emitting apparatus and electronic apparatus capable of irradiating uniformly with UV rays the luminescent layers disposed at different positions and causing the luminescent layers to emit colored rays of light without uneven brightness.

Still another object of the present invention is to provide UV ray emitting apparatus and electronic apparatus having a backlight function for a liquid crystal display unit.

A further object of the present invention is to provide UV ray emitting apparatus and electronic apparatus capable of causing luminescent layers and a flat-surface type light emitting element to emit different-colored rays of light and mix these rays of light to provide an improved highly colorful and very ornamental display.

In order to achieve the above objects, according to one aspect of the present invention, a UV ray emitting element provided below an optically transparent display unit (for example, liquid crystal display unit) irradiates from below a luminescent layer provided on the display unit with UV rays emitted thereby. The luminescent layer reacts to the UV rays to emit colored rays of light.

In another aspect Of the present invention, a UV ray emitting element provided below an optically transparent display unit (for example, liquid crystal display unit) irradiates from below a luminescent layer provided on the display unit with UV rays emitted thereby. In addition, a wavelength selector provided on a transparent cover which is disposed above the display unit reflects the UV rays, which then cause the luminescent layer to emit colored rays of light.

In still another aspect of the present invention, a flat-surface light-emitting element is provided below an optically transparent display unit (for example, liquid crystal display unit) to irradiate from below a luminescent layer provided on the display unit with rays of light emitted thereby. In addition, a UV ray emitting element is provided on an outer periphery of the display unit at a higher position than the display unit for irradiating the display unit downward with UV rays emitted thereby.

In a further aspect of the present invention, a luminescent layer is provided on a optically transparent touch-in element for reacting to UV rays to emit colored rays of light. A UV ray emitting element is provided below the touch-in element for irradiating from below the touch-in element with UV rays emitted thereby

Figure 1:
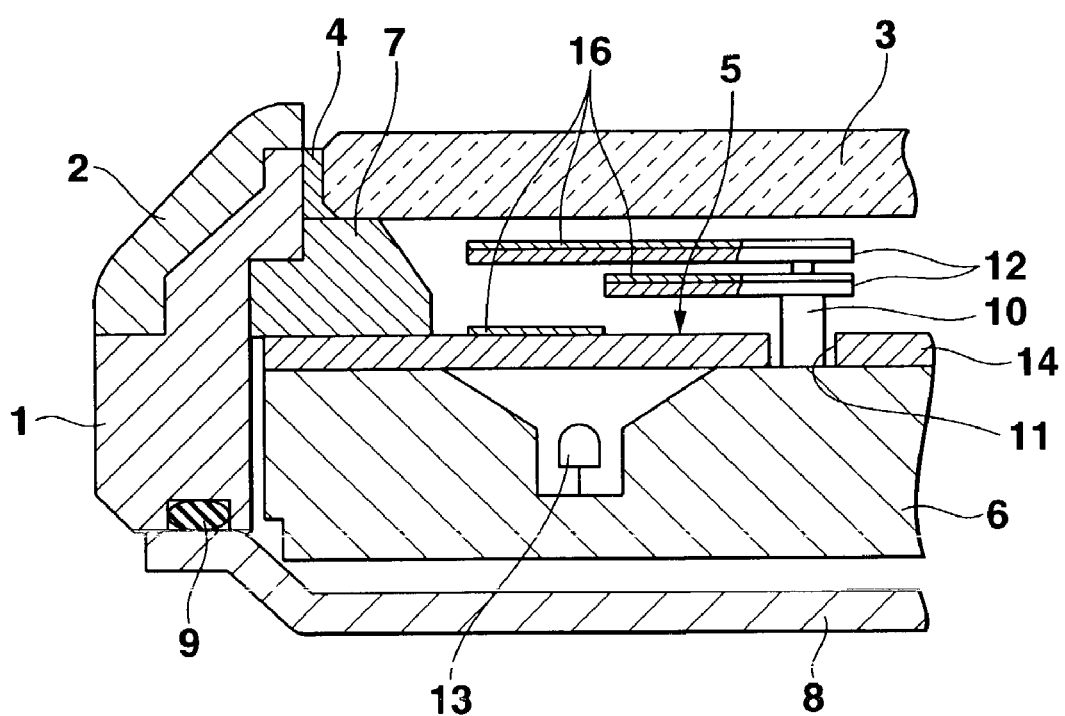
FIG. 1 is an enlarged cross-sectional view of a main portion of a wristwatch as a first embodiment of the present invention.
Figure 2:
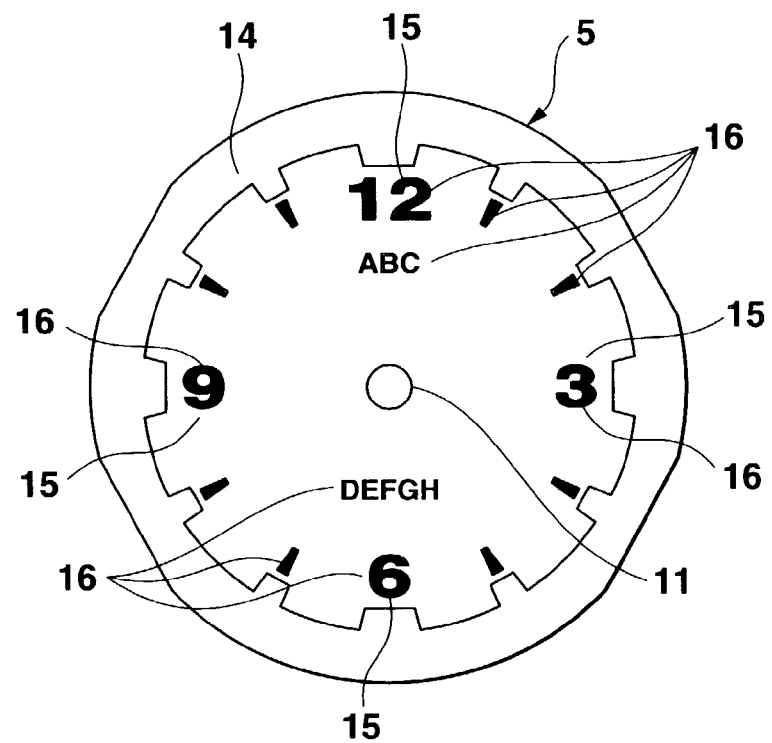
FIG. 2 is an enlarged plan view of a face of the wristwatch of FIG. 1.
Figure 3:
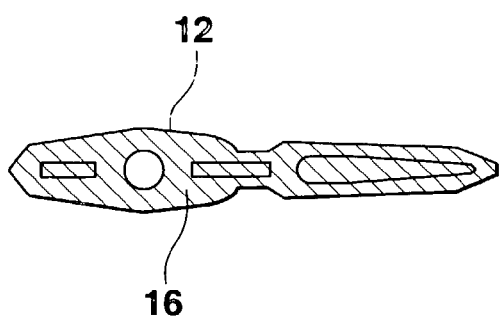
FIG. 3 is an enlarged plan view of a hand of the wristwatch of FIG. 1.

DESCRIPTION OF THE EMBODIMENTS (1) First Embodiment:

Referring to FIGS. 1–3, an electronic apparatus, more particularly a wristwatch, as a first embodiment of the present invention will be described next.

FIG. 1 is an enlarged cross-sectional view of a main portion of the wristwatch. The wristwatch comprises a case 1, a bezel 2 forming an upper periphery of the wristwatch, and a crystal 3 forming a top of the wristwatch through a packing 4. The case 1 contains a face 5 as a display unit, a watch module 6 and a ring-like spacer 7. The case 1 also has a back cover 8 through a waterproof ring 9 attached to a lower surface thereof. The spacer 7 is provided coaxially within an inner surface of the case 1 between the crystal 3 and the face 5.

The watch module 6 has at least an analog function although it can additionally have a digital function. The watch module 6 comprises a hand shaft 10 extending upward through a hole 11 in the face 5, and hands 12 such as hour and minute hands attached to an upper end of the hand shaft 10 so as to rotate above the face 5. The watch module 6 has an UV ray emitting element 13 called a blacklight below the face 5. The UV ray emitting element 13 comprises an UV ray emitting lamp or diode that emits UV rays having a wavelength of about 365 nm or in a range of 254 through 365 nm.

The watch face 5 comprises a transparent plastic disk 14 that has a function of substantially uniformly diffusing UV rays emitted by the UV ray emitting element 13. As shown in FIG. 2, the face disk 5 has hour indicating characters 15 and indexes disposed along its outer periphery, and other marks, which are covered with luminescent layers 16 formed by printing or coating. As shown in FIG. 3, the overall area of each of the hands 12 is also covered with a luminescent layer 16.

These luminescent layers 16 react to UV rays having a wavelength in a range of 350–420 or 254–365 nm to thereby emit corresponding colored rays of light, and when they are not irradiated with UV rays, exhibit a transparent state. The luminescent layers 16 each are preferably covered with a transparent cover (not shown). The luminescent layers 16 can provide rays of light having 10–13 different colors that include three basic colors, that is, green (or yellow), blue and red and their variations depending upon the materials thereof. All the respective luminescent layers 16 may emit rays of light having the same color, but in order to easily recognize time visually, at least the luminescent layers on the watch face 5 and the hands 12 preferably emit rays of light having different colors. Preferably, for example, the luminescent layers 16 on the face 5 emit red rays of light whereas the luminescent layers 16 on the hands 12 emit blue rays of light. The luminescent layers 16 on the marks on the face 5 and the luminescent layers 16 on the hour numerals 15 preferably emit rays of light having different colors, respectively.

According to this wristwatch, the luminescent layers 16 formed on the face disk 5 and the hands 12 are transparent, for example, in a bright place in a house that is not substantially irradiated with UV rays. Therefore, the surfaces (background color) of the watch face 5 and the hands 12 are not influenced by the respective corresponding luminescent layers 16 thereon and show through to thereby allow time to be visually recognized with the aid of the face 5 and the hands 12. When the UV ray emitting element 13 emits UV rays, the UV rays are substantially uniformly diffused and radiated upward by the transparent plastic disk 14 for the watch face 5. Thus, the luminescent layers 16 are uniformly irradiated with the UV rays to thereby react to the UV rays to emit corresponding colored rays of light. Therefore, we can visually recognize time even in any of bright and dark places.

At this time, the luminescent layers 16 on the watch face 5 and on the hands 12 may emit different colored rays of light, for example, red and blue, respectively. Thus, time can be visually recognized satisfactorily.

As described above, according to this wristwatch, the UV ray emitting element 13 provided below the display unit can be caused to emit UV rays on demand to thereby cause the luminescent layers 16 to emit corresponding colored rays of light that provide a highly colorful and very ornamental display.

Figure 4A:
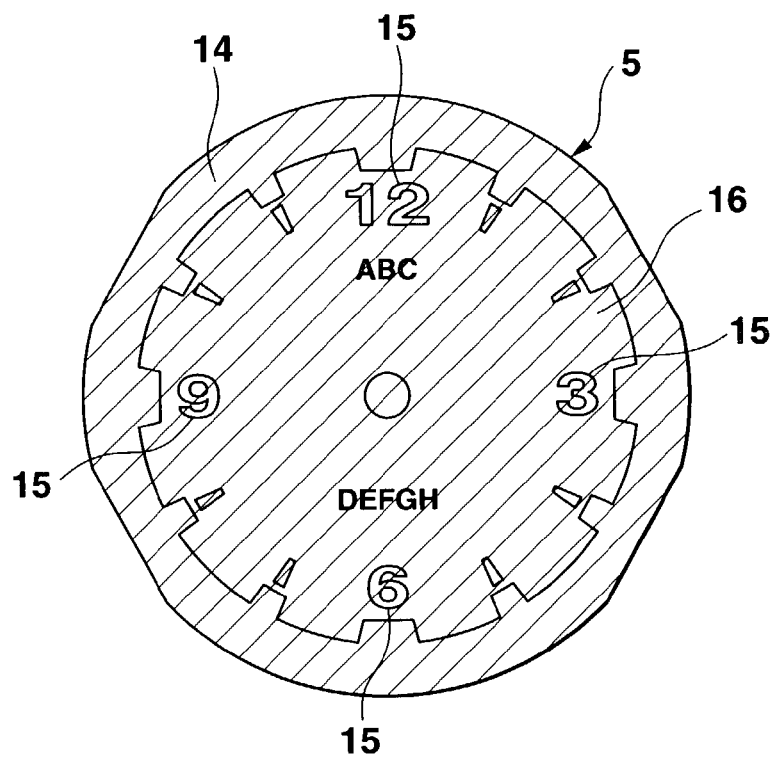
FIG. 4A is a plan view of a modification of the face of the wristwatch of FIG. 2.
Figure 4B:
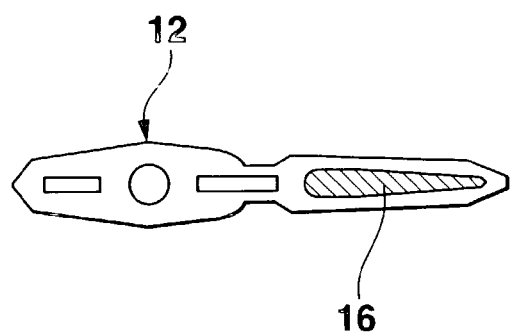
FIG. 4B is a plan view of a modification of the hand of the wristwatch of FIG. 3.

While in the present embodiment the luminescent layers 16 are illustrated as being provided on parts of the upper surface of the transparent disk 14 and on the upper overall surface of the hands 12, the luminescent layer 16 may be provided on the upper overall surface of the face disk 14, as shown in FIG. 4A and a luminescent layer 16 may be provided on a part of the upper surface of the hand 12, as shown in FIG. 4B. In these cases the luminescent materials 16 formed on the watch face 5 and on the hands 12 are preferably different so as to emit rays of light having different colors. In this case the wristwatch provides similar advantageous effects to those provided by the first embodiment.

While the luminescent layers 16 are illustrated as being provided on the upper surface of the transparent disk 14 for the watch face 5 in the present embodiment and its modifications, they need not necessarily be provided on the upper surface of the disk 14 and may be provided instead on a lower surface of the disk 14.

Figure 5:
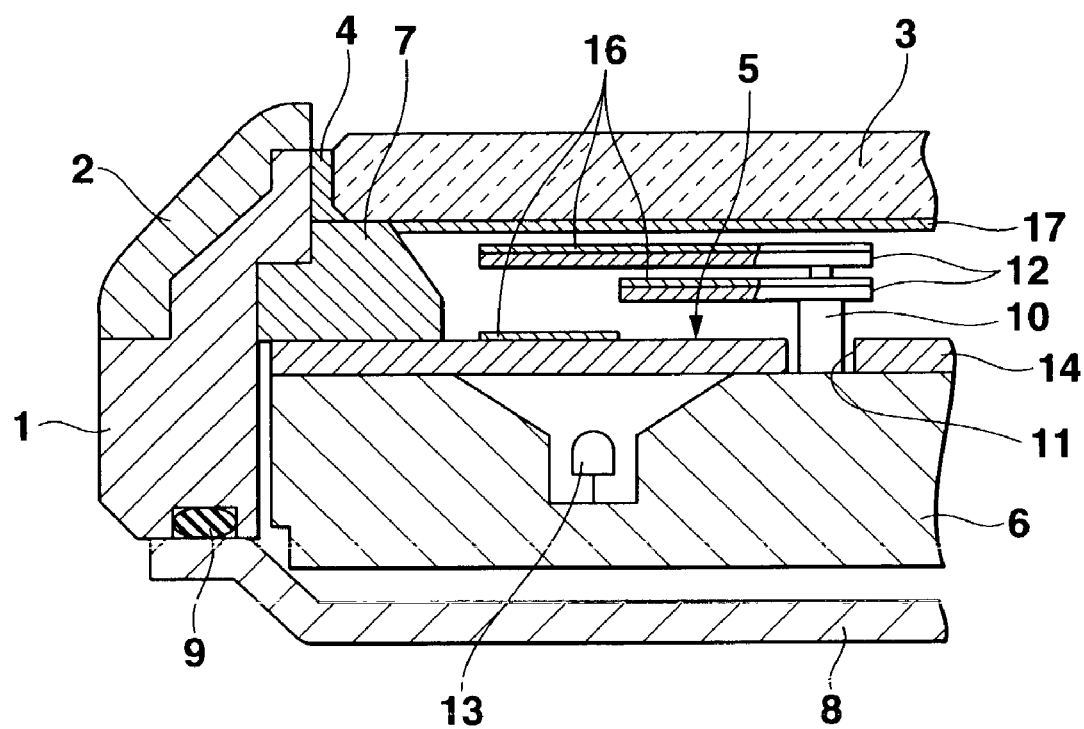
FIG. 5 is an enlarged cross-sectional view of a wristwatch with a dichroic mirror as a second embodiment.

(2) Second Embodiment:

Referring to FIG. 5, a wristwatch as a second embodiment will be described. The same reference numeral is used to identify the same element of the second and first embodiments of FIGS. 5 and 1–3.

This wristwatch has the same structure as the first embodiment excluding that a dichroic mirror 17 as a wavelength selector is provided on a lower surface of the crystal 3. The dichroic mirror 17 takes the form of a wavelength selecting film half evaporated on a lower surface of the crystal 3 so that it reflects UV rays and allows other rays of light to pass therethrough.

When the UV ray emitting element 13 emits UV rays in this wristwatch, the UV rays are diffused by the transparent plastic disk 14 to strike on the luminescent layers 16 uniformly as in the first embodiment. Thus, the transparent luminescent layers 16 react to the UV rays to emit corresponding colored rays of light. Thus, time can be visually recognized through the crystal 3 and the dichroic mirror 17. At this time, the UV rays having passed through the transparent plastic disk 14 are reflected by the dichroic mirror 17 and again strike on the respective luminescent layers 16 on the watch face 5 and the hands 12. In this case, the UV rays do not leak out of the case 1, so that the luminescent layers 16 are irradiated efficiently with the UV rays. Therefore, the luminescent layers 16 can more clearly emit corresponding colored rays than in the first embodiment.

Figure 6:
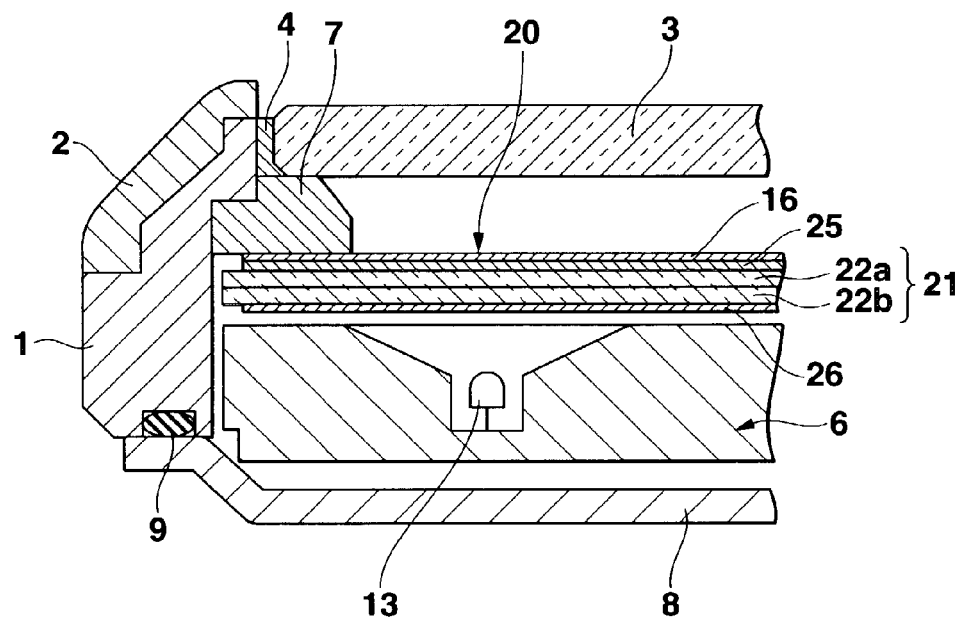
FIG. 6 is an enlarged cross-sectional view of a main portion of a wristwatch using a liquid crystal display unit as a third embodiment.
Figure 7:
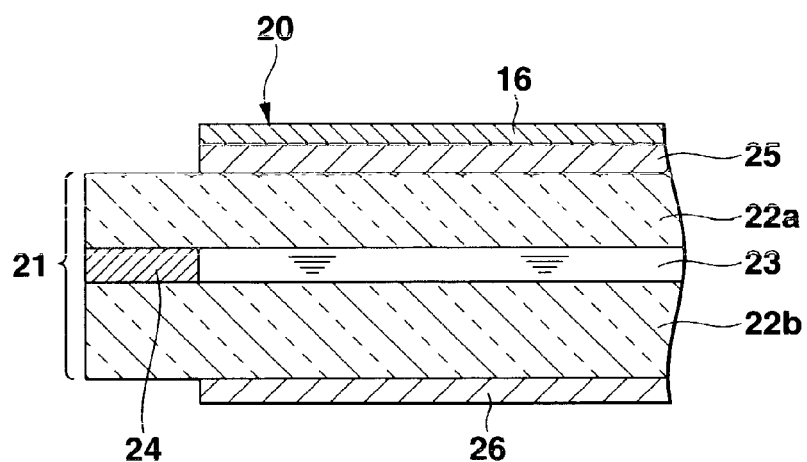
FIG. 7 is an enlarged cross-sectional view of a main portion of the liquid crystal display unit of FIG. 6.

(3) Third Embodiment:

Referring to FIGS. 6 and 7, a wristwatch as a third embodiment will be described next. Also, in this case the same reference numeral is used to identify the same element of the third and first embodiments of FIGS. 6, 7 and 1–3.

This wristwatch has substantially the same structure as the first embodiment excluding that it has a digital function instead of the analog function of the watch module 6 provided within the case 1 mentioned above, that is, a liquid crystal display unit 20 instead of the watch face 5 and the hands 12.

As shown in FIG. 7, the liquid crystal display unit 20 comprises a liquid crystal cell 21 that include a pair of upper and lower transparent electrodes 22a and 22b between which liquid crystal 23 is sealed with a sealant 24, an upper polarizing plate 25 provided on an upper surface of the cell 21, and a lower semitransparent polarizing plate 26 provided on a lower surface of the cell 21. In the liquid crystal display unit 20 of FIG. 6, external light enters the liquid crystal cell 21 through the upper polarizing plate 25. A part of the external light having passed through the cell 21 is reflected by the lower polarizing plate 26 to thereby display information such as time depending on a state in which a voltage is selectively applied across the pair of electrodes 22a and 22b.

As shown in FIGS. 6 and 7, luminescent layers 16 are formed by printing or coating on parts or all of an upper surface of the upper polarizing plate 25 of the liquid crystal display unit 20 to react to UV rays to emit corresponding colored rays of light and in an ordinary state where they are not irradiated with UV rays, to exhibit a transparent state. Like the first embodiment, an UV ray emitting element 13 is provided below the liquid crystal display unit 20 to emit UV rays. A diffuser plate (not shown) is preferably provided between the liquid crystal display unit 20 and the UV ray emitting element 13 to diffuse UV rays emitted by the UV ray emitting element 13 to thereby irradiate the lower overall surface of the liquid crystal display unit 20 with the UV rays.

According to this wristwatch, since the luminescent layers 16 provided on the upper surface of the upper polarizing plate 25 are transparent, for example, in a bright place within a house that is not substantially irradiated with UV rays, a part of external light having passed through the crystal 3, and the luminescent layers 16, upper polarizing plate 25 and liquid crystal cell 21 of the liquid crystal element 20 is reflected by the lower polarizing plate 26 to thereby allow information such as time displayed on the liquid crystal display unit 20 to be visually recognized satisfactorily.

When the UV ray emitting element 13 emits UV rays, the UV rays pass through the lower polarizing plate 26, liquid crystal cell 21 and upper polarizing plate 25 of the liquid crystal display 20 to thereby strike on the luminescent layers 16 to cause the luminescent layers 16 to react to the UV rays and hence to emit corresponding colored rays of light. Thus, this wristwatch can also cause the UV ray emitting element 13 provided under the display unit 20 to emit UV rays on demand to thereby cause the luminescent layers 16 to emit corresponding colored rays of light to provide a highly colorful and very ornamental display.

Figure 8A:
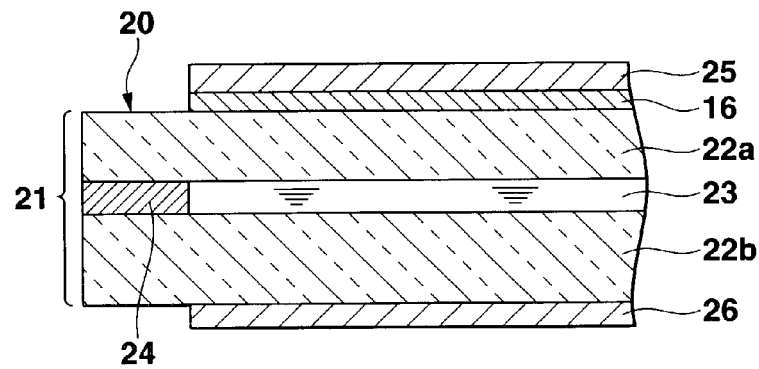
FIG. 8A is an enlarged cross-sectional view of a main portion of a liquid crystal display unit with luminescent layers provided on an upper surface of a liquid crystal display cell thereof.

While in this third embodiment the luminescent layers 16 are illustrated as being provided on the upper surface of the upper polarizing plate 25 of the liquid crystal display unit 20, the luminescent layers 16 may be provided between the upper polarizing plate 25 and the liquid crystal cell 21, or on the upper surface of the cell 21, as shown in a first modification of FIG. 8A to produce similar advantageous effects to the third embodiment.

Figure 8B:
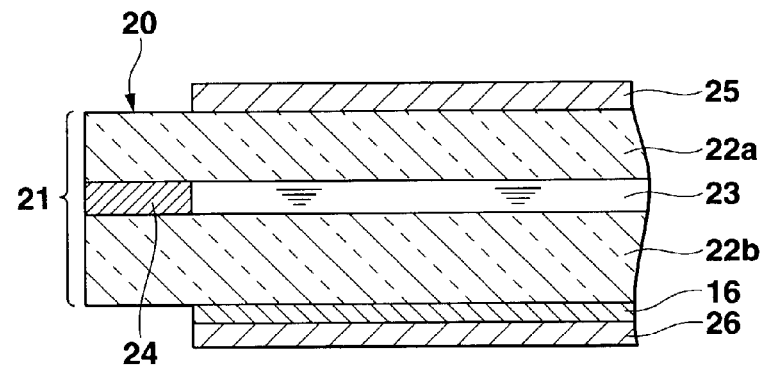
FIG. 8B is an enlarged cross-sectional view of a main portion of a liquid crystal display unit with luminescent layers provided on a lower surface of the liquid crystal display cell thereof.
Figure 8C:
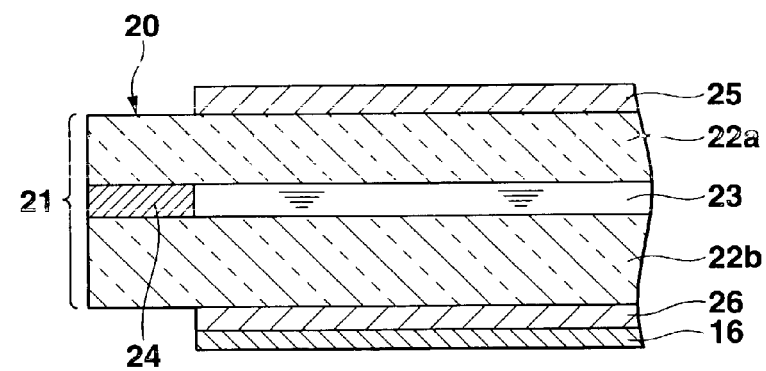
FIG. 8C is an enlarged cross-sectional view of a main portion of a liquid crystal display unit with luminescent layers provided on a lower surface of a lower polarizing plate.

Alternatively, the luminescent layers 16 may be provided between the liquid crystal cell 21 and the lower polarizing plate 26, or on a lower surface of the liquid crystal cell 21, as in a second modification of FIG. 8B. Alternatively, the luminescent layers 16 may be provided on a lower surface of the lower polarizing plate 26, in a third modification of FIG. 8C. The second and third modifications produce similar effects to those produced by the third embodiment Since the luminescent layers 16 of FIGS. 8B and 8C are provided below the liquid crystal cell 21, they can fulfill a function of a backlight for the liquid crystal display unit 20 when the luminescent layers 16 react to UV rays to emit corresponding colored rays of light. Therefore, information such as time displayed on the liquid crystal display unit 20 can be visually recognized on a background of various colored rays of light emitted by the luminescent layers 16 even in any of bright and dark places.

Figure 9:
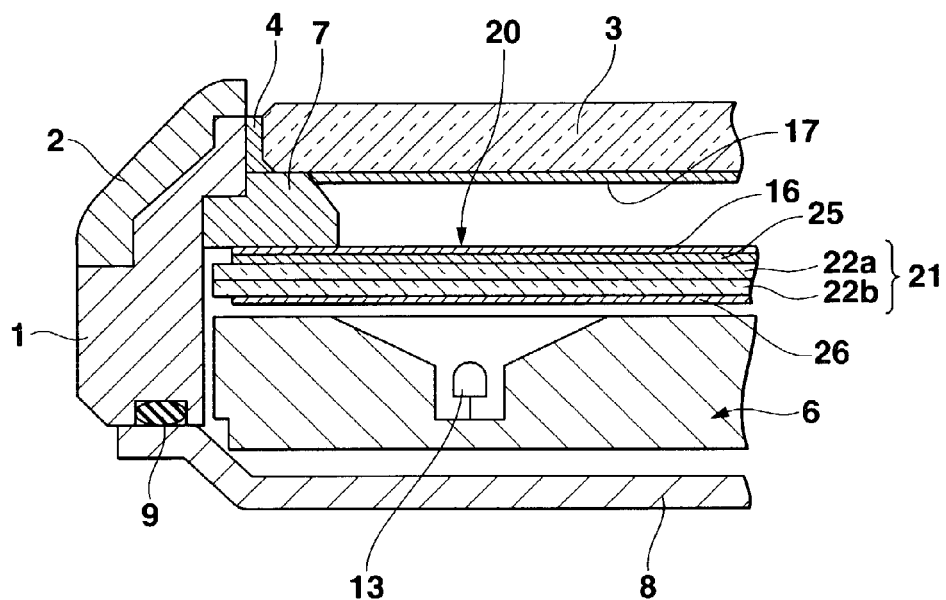
FIG. 9 is an enlarged cross-sectional view of a main portion of a wristwatch with a dichroic mirror as a fourth embodiment.

(4) Fourth Embodiment:

Referring to FIG. 9, a wristwatch in a fourth embodiment will be described. The same reference numeral is used to identify the same element of the fourth embodiment of FIG. 9 and the second and third embodiments of FIGS. 5–7.

This wristwatch has the same structure as the third embodiment excluding that a dichroic mirror 17 as a wavelength selector is provided by half evaporation on a lower surface of the crystal 3 to reflect UV rays and to allow other rays of light to pass there through as in the second embodiment.

According to this wristwatch, information such as time displayed on the liquid crystal display unit 20 through the crystal 3 and the dichroic mirror 17 can be visually recognized in a bright place that is not irradiated with UV rays. When the UV ray emitting element 13 is caused to emit UV rays, the luminescent layers 16 provided on the upper surface of the liquid crystal display unit 20 are irradiated with the UV rays to thereby cause the transparent luminescent layers 16 to react to the UV rays to emit corresponding colored rays of light. At this time, the UV rays having passed through the liquid crystal display unit 20 are reflected by the dichroic mirror 17 provided on the crystal 3, the reflected UV rays again enter the liquid crystal display unit 20 to thereby strike on the luminescent layers 16. Therefore, as in the second embodiment this irradiation is performed efficiently to thereby to cause the same to emit corresponding colored rays of light more clearly than the third embodiment.

Figure 10:
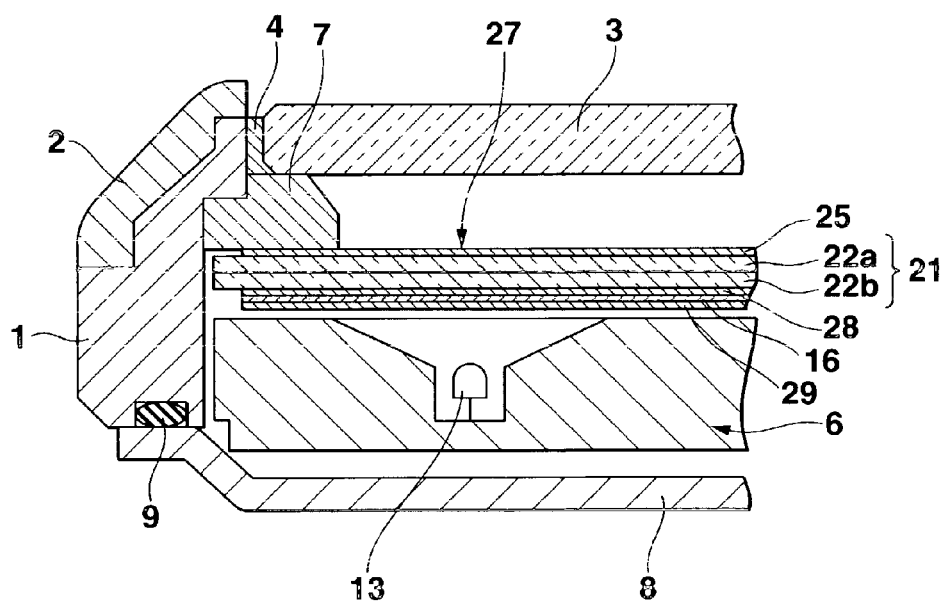
FIG. 10 is an enlarged cross-sectional view of a main portion of a wristwatch with a liquid crystal display unit using a semitransparent reflective plate as a fifth embodiment.
Figure 11:
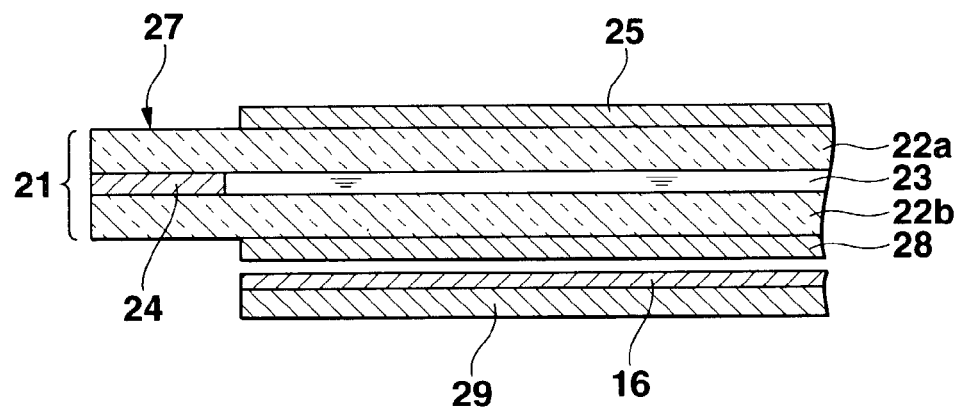
FIG. 11 is an enlarged cross-sectional view of a main portion of a liquid crystal display unit of FIG. 10.

(5) Fifth Embodiment:

Referring to FIGS. 10 and 11, a wristwatch as a fifth embodiment will be described. The same reference numeral is also used to identify the same element of the fifth embodiment of FIGS. 10 and 11 and the third embodiment of FIGS. 6 and 7.

This wristwatch has the same structure as the third embodiment excluding the structure of a liquid crystal display unit 27. As shown in FIG. 11, the liquid crystal display unit 27 comprises a liquid crystal cell 21 that, in turn, comprises a pair of transparent electrodes 22a and 22b, and liquid crystal 23 sealed with a sealant 24 between the pair of electrode 22a and 22b, an upper polarizing plate 25 and a lower transparent polarizing plate 28 provided on upper and lower surfaces, respectively, of the liquid crystal cell 21, a semitransparent reflective plate 29 provided below the lower polarizing plate 28, and transparent luminescent layers 16 provided on an upper surface of the semitransparent reflective plate 29.

In the liquid crystal display unit 27 of FIG. 10, a part of external light having passed through the crystal 3, upper polarizing plate 25, liquid crystal cell 21, lower polarizing plate 28 and the luminescent layers 16 is reflected by the semitransparent reflective plate 29 to display information such as time depending on a state in which a voltage is selectively applied across the pair of electrodes 22a and 22b.

As in the first embodiment, the luminescent layers 16 react to UV rays to emit corresponding colored rays of light whereas when they are in an ordinary state in which they are not irradiated with UV rays, they exhibit transparency. As shown in FIGS. 10 and 11, the luminescent layers 16 are provided by printing or coating on the upper surface of the semitransparent reflective plate, 29. The UV ray emitting element 13 is provided below the liquid crystal display unit 27. Also, in this case a diffuser plate (not shown) is provided between the liquid crystal display unit 27 and the UV ray emitting element 13 to diffuse the UV rays emitted by the UV ray emitting element 13 to thereby irradiate the lower overall surface of the liquid crystal display unit 27 uniformly with the diffused UV rays.

According to this wristwatch, the luminescent layers 16 provided on the upper surface of the semitransparent reflective plate 29 of the liquid crystal display unit 27 are transparent, for example, in a bright place in a house that is not substantially irradiated with UV rays, as in the third embodiment. Therefore, a part of external light having passed through the crystal 3, the upper polarizing plate 25, the liquid crystal cell 21, the lower polarizing plate 28 and the luminescent layers 16 is reflected by the semitransparent reflective plate 29 to thereby allow information such as time displayed on the liquid crystal display unit 27 to be visually recognized satisfactorily.

When the UV ray emitting element 13 is caused to emit UV rays, the luminescent layers 16 are irradiated with the UV rays through the semitransparent reflective layer 29 of the liquid crystal display unit 27 to thereby cause the luminescent layers 16 to react to the UV rays to emit corresponding colored rays of light. Thus, the luminescent layers 16 can fulfill a function of backlight for the liquid crystal display unit 27. Therefore, information such as time displayed on the display unit can be visually recognized on a background of differently colored rays of light emitted by the luminescent layers 16 even in any of bright and dark places. Thus, as in the third embodiment this wristwatch can cause the UV ray emitting element 13 to emit UV rays on demand to thereby cause light. Thus, the respective luminescent layers 16 emit corresponding colored rays of light to thereby provide a highly colorful and very ornamental display.

Figure 12:
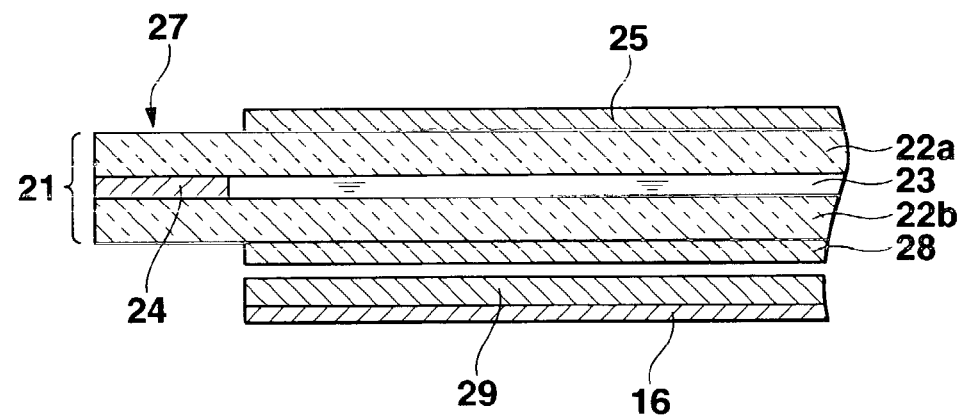
FIG. 12 is an enlarged cross-sectional view of a main portion of a modification of the fifth embodiment in which luminescent layers are provided on a lower surface of a semitransparent reflective plate for a liquid crystal display unit.

While in the fifth embodiment the luminescent layers 16 are illustrated as being provided on the upper surface of the semitransparent reflective plate 29 of the liquid crystal display unit 27, they may be provided on a lower surface of the semitransparent reflective plate 29 as shown in a modification of FIG. 12. This arrangement can also produce similar advantageous effects to those produced by the fourth embodiment. As in the third embodiment of FIG. 7 and the respective modifications of FIGS. 8A–8C, the luminescent layers 16 of the fifth embodiment may be provided on the upper surface of the upper polarizing plate 25, the upper and lower surfaces of the liquid crystal cell 21 and the lower surface of the lower polarizing plate 28, of the liquid crystal display unit 27.

Also, in the fifth embodiment and its modification a dichroic mirror 17 that reflects UV rays and allows other rays of light to pass therethrough may be provided by half evaporation on a lower surface of the watch crystal 3. In this arrangement, when the UV rays emitted by the UV ray emitting element 13 cause the luminescent layers 16 to emit corresponding colored rays of light, which then pass through the liquid crystal display unit 27, as in the fourth embodiment, the UV rays having passed are reflected by the dichroic layers 16. Therefore, the luminescent layers 16 can be irradiated efficiently with the UV rays and hence the luminescent layers 16 can be caused to emit corresponding colored rays of light more clearly than the fifth embodiment.

Figure 13:
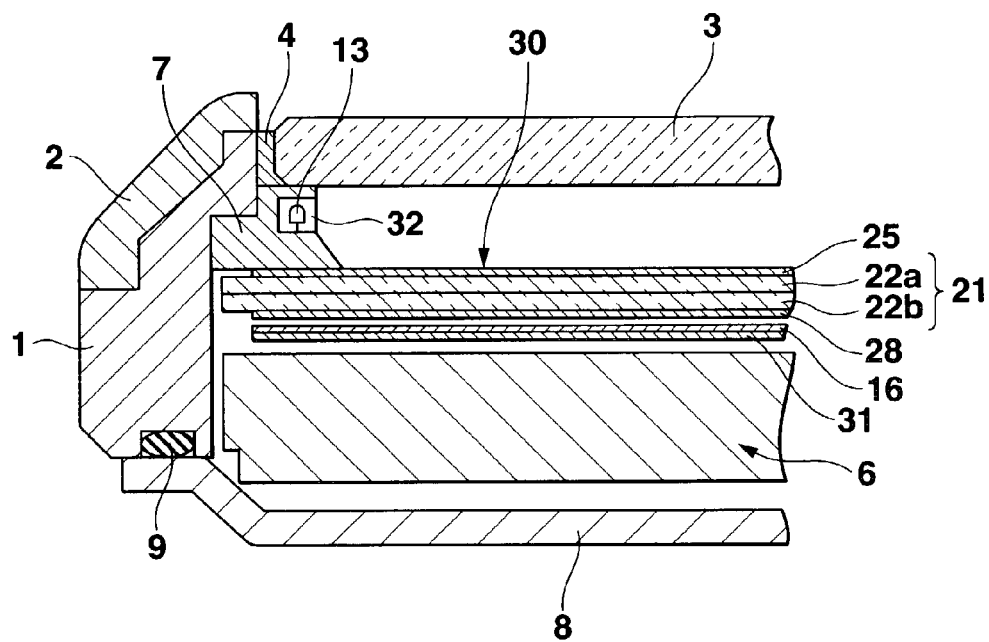
FIG. 13 is an enlarged cross-sectional view of a main portion of a wristwatch with an electroluminescent element as a sixth embodiment.

(6) Sixth Embodiment:

Referring to FIG. 13, a wristwatch as a sixth embodiment will be described next. The same reference numeral is used to identify the same element of the sixth embodiment of FIG. 13 and the third embodiment of FIGS. 6 and 7.

This wristwatch has substantially the same structure as the third embodiment excluding that it comprises an electroluminescent element 31 provided below a liquid crystal display unit 30 and a UV ray emitting element 13 provided at a point on the inner periphery of a ring-like spacer 7 provided coaxially with and on an upper surface of the liquid crystal display unit 30.

The liquid crystal display unit 30 is of the transparent type that comprises an upper polarizing plate 25 provided on the upper surface of the liquid crystal cell 21 identical to that of the third embodiment, and a lower transparent polarizing plate 25 identical to that of the fifth embodiment provided on the lower surface of the liquid crystal cell 21.

The electroluminescent element 31 is a flat-surface light-emission type element that comprises a pair of upper transparent anode and lower cathode electrodes and an electroluminescent layer provided between the pair of electrodes so that when a voltage is applied across the pair of electrodes, the overall electroluminescent layer emits corresponding colored rays of light uniformly. Luminescent layers 16 are provided by printing or coating on the upper surface of the EL element 31 to react to UV rays so as to emit corresponding colored rays of light and in an ordinary state in which they are not irradiated with UV rays, to exhibit transparency.

As briefly described above, the UV ray emitting element 13 is disposed within the recess provided on the inner periphery of the ring-like spacer 7 at a point higher than the liquid crystal display unit 30. In this case, the ring-like spacer also functions as a protective or shock-absorbing member within the case 1. The UV ray emitting element 13 is arranged to irradiate the liquid crystal display unit 30 with the UV rays emitted obliquely downward from its position. In this case, the recess 32 on the ring-like spacer 7 protects the UV ray emitting element 13 except for its front side open to the inside of the case 1.

The luminescent layers 16 provided on the upper surface of the electroluminescent element 31 are transparent in this wristwatch. Thus, the colored rays of light emitted from the flat-surface of the electroluminescent element 31 pass upward through the luminescent layers 16 and the liquid crystal display unit 30. Therefore, information displayed on the liquid crystal display unit 30 can be visually recognized satisfactorily even in any of bright and dark places. When the UV ray emitting element 13 is caused to emit UV rays, these UV rays strive on the liquid crystal display unit 30 obliquely downward. These UV rays pass through the liquid crystal display unit 30 to strike on the luminescent layers 16 provided on the upper surface of the electroluminescent element 31 to thereby cause the transparent luminescent layers 16 to react to the UV rays to emit colored rays of light.

Thus, in this wristwatch the colored rays of light emitted by the luminescent layers 16 function as a backlight to illuminate the liquid crystal display unit 30. The information displayed on the liquid crystal display unit 30 can be visually recognized satisfactorily even in any of bright and dark places. Especially, when both the electroluminescent elements 31 and the UV ray emitting element 13 are caused to emit their respective rays of light simultaneously, the colored rays of light emitted by the electroluminescent elements 31 and the luminescent layers 16 concerned are mixed to thereby form a background color on which the information displayed on the liquid crystal display unit 30 can be visually recognized.

As described above, even in this wristwatch the UV ray emitting element 13 can be caused to emit UV rays on demand to thereby cause the luminescent layer 16 to emit corresponding colored rays of light. Thus, information displayed on the liquid crystal display unit 30 can be visually recognized, and the electroluminescent elements 31 can be caused to emit rays of light from its flat-surface to allow the information displayed on the liquid crystal display unit 30 to be visually recognized. When both the luminescent layers 16 and the electroluminescent element 31 are caused to emit their respective colored rays of light simultaneously, these colored rays of light are mixed to provide a more highly colorful and very ornamental display.

While in the sixth embodiment the luminescent layers 16 are illustrated as being provided on the upper surface of the electroluminescent elements 31, the luminescent layers 16 may be provided on the upper surface of the upper polarizing plate 25, on both the upper and lower surfaces of the liquid crystal cell 21 or on the lower surface of the lower polarizing plate 28, of the liquid crystal display unit 30, as in the modifications of FIG. 7 and 8A–8C. Such arrangements produce advantageous effects similar to those produced by the sixth embodiment. Especially, when UV rays are emitted, the luminescent layers 16 of the electroluminescent element 31 and the liquid crystal display unit 30 emit respective colored rays of light, which are mixed to provide a more highly colorful and very ornamental display than the sixth embodiment.

Also, in the sixth embodiment a dichroic mirror 17 that reflects UV rays and allows other rays of light to pass therethrough may be provided by half-evaporation on a lower surface of the watch crystal 3. According to such arrangement, the UV rays emitted by the UV ray emitting element 13 are reflected by the dichroic mirror 17 on the crystal 3. Therefore, no UV rays leak through the crystal 3 out of the case 1. Thus, the luminescent layers 16 are irradiated efficiently with the UV rays to thereby emit corresponding colored rays of light more clearly than the sixth embodiment.

Figure 14:
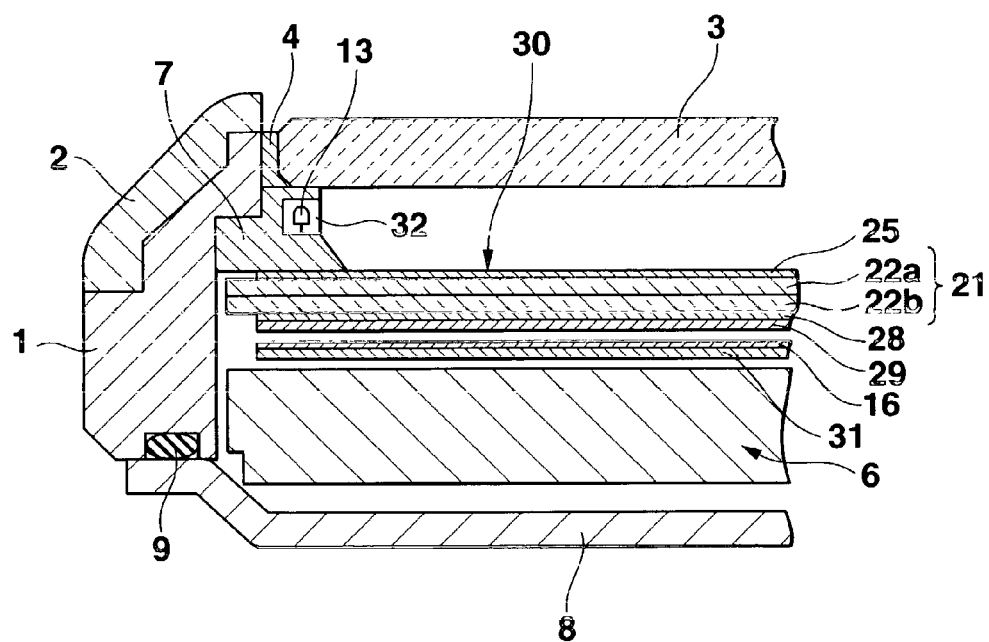
FIG. 14 is an enlarged cross-sectional view of a main portion of a wristwatch that comprises an electroluminescent element and a liquid crystal display unit with a semitransparent reflective plate as a seventh embodiment.

(7) Seventh Embodiment:

Referring to FIG. 14, a wristwatch as a seventh embodiment will be described next. In this case, the same reference numeral is used to identify the same element of the embodiment of FIG. 14 and the fifth and sixth embodiments of FIGS. 10, 11 and 13.

This wristwatch has substantially the same structure as the sixth embodiment excluding that an electroluminescent element 31 is provided on a lower surface of the liquid crystal display unit 27 with the semitransparent reflective plate 29 in the fifth embodiment. Also, in this case the luminescent layers 16 that react to UV rays to emit corresponding colored rays of light, and when they are in an ordinary state where they are not irradiated with UV rays, exhibit transparency are provided on an upper surface of the electroluminescent elements 31.

As in the fifth embodiment, the liquid crystal display unit 27 comprises an upper polarizing plate 25 provided on an upper surface of a liquid crystal cell 21 that includes a pair of upper and lower transparent electrodes 22a and 22b between which liquid crystal 23 is sealed with a sealant 24, a lower transparent polarizing plate 28 provided on a lower surface of the liquid crystal cell 21 and a semitransparent reflective plate 29 provided on a lower surface of the lower polarizing plate 28.

As the sixth embodiment, the UV ray emitting element 13 is disposed in a recess 32 provided on the inner periphery of the ring-like spacer 7 at a higher position than the liquid crystal display unit 2 within the case 1 to irradiate the liquid crystal display unit 27 obliquely downward with the emitted UV rays emitted thereby.

In this wristwatch, the liquid crystal display unit 27 comprises the semitransparent reflective plate 29. Therefore, external light taken through the watch crystal 3 in a bright place enters the upper surface of the liquid crystal display unit 27, a part of the entering external light is reflected by the semitransparent reflective plate 29 provided on the lower surface of the liquid crystal display unit 27. Therefore, even when no electroluminescent elements 31 is lighted up, information displayed on the liquid crystal display unit 27 can be visually recognized.

When the electroluminescent element 31 is caused to emit corresponding colored rays of light from its surface and because the luminescent layers 16 provided on the upper surface of the electroluminescent elements 31 are transparent, the emitted colored rays of light pass upward through the luminescent layers 16, semitransparent reflective plate 29, and the liquid crystal display unit 27 as in the sixth embodiment. Therefore, information displayed on the liquid crystal display unit 27 can be visually recognized satisfactorily even in any of bright place and dark places.

When the UV ray emitting element 13 is caused to emit UV rays, these UV rays enter the liquid crystal display unit 27 obliquely downward, and a part of the entering UV rays passes through the semitransparent reflective plate 29 as in the sixth embodiment. The passing UV rays then strike on and react to the luminescent layers 16 provided on the upper surface of the electroluminescent element 31 to thereby cause the semitransparent luminescent layers 16 to emit corresponding colored rays of light. Thus, the colored rays of light emitted by the luminescent layers 16 also function as a backlight to illumine the liquid crystal display unit 27. Therefore, information displayed on the liquid crystal display unit 27 can be visually recognized satisfactorily even in any of bright and dark places.

As described above, according to this wristwatch the information displayed on the liquid crystal display unit 30 can be visually recognized in a bright place without causing the electroluminescent element 31 and the UV ray emitting element 13 to emit their respective rays of light or by causing one of them to emit corresponding rays of light. Especially, when both the electroluminescent element 31 and the UV ray emitting element 13 are caused to emit their respective rays of light simultaneously, the colored rays of light emitted by the electroluminescent element 31 and the colored rays of light emitted by the luminescent layers 16 based on the UV rays emitted by the UV ray emitting element 13 are mixed to thereby form a corresponding colored background on which the information displayed on the liquid crystal display unit 30 can be visually recognized as in the sixth embodiment. Thus, a highly colorful and very ornamental display is provided as in the sixth embodiment.

While in the seventh embodiment the luminescent layers 16 are illustrated as being provided on the upper surface of the electroluminescent elements 31, the present invention is not limited to this particular embodiment. For example, in the seventh embodiment, additional luminescent layers that emit different colored rays of light may be provided on the upper surface of the semitransparent reflective plate 29 as shown by 16 in the fifth embodiment of FIGS. 10 and 11 or on the lower surface of the semitransparent reflective plate 29 as shown by 16 in the modification of FIG. 12. Alternatively, also in the seventh embodiment, the luminescent layers that emit different colored rays of light may be provided on the upper surface of the upper polarizing plate 25 of the liquid crystal display unit 20, both on the upper and lower surfaces of the liquid crystal cell 21 of the liquid crystal display unit 20, or on the lower surface of the lower polarizing plate 26 of the liquid crystal display unit 20, as shown by 16 in the respective modifications of FIGS. 7 and 8A–8C. Those arrangements produce similar advantageous effects to those produced by the seventh embodiment. In addition, especially, when UV rays are emitted, both the luminescent layers 16 provided on the electroluminescent elements 31 and the additional luminescent layers provided as mentioned above emit respective different colored rays of light, which are then mixed to thereby provide a more highly colorful and very ornamental display than the seventh embodiment.

Also, in the seventh embodiment a dichroic mirror 17 that reflects UV says and allows other rays of light to pass therethrough may be provided by half evaporation on the lower surface of the watch crystal 3. According to such arrangement, the UV rays emitted by the UV ray emitting element 13 are reflected by the dichroic mirror 17 provided on the watch crystal 3 as in the fourth embodiment, so that the UV rays do not leak out from the case 1 through the crystal 3. Therefore, the luminescent layers 16 are irradiated efficiently with the UV rays to thereby to cause the luminescent layers 16 to emit colored rays of light more clearly than the seventh embodiment.

Figure 15:
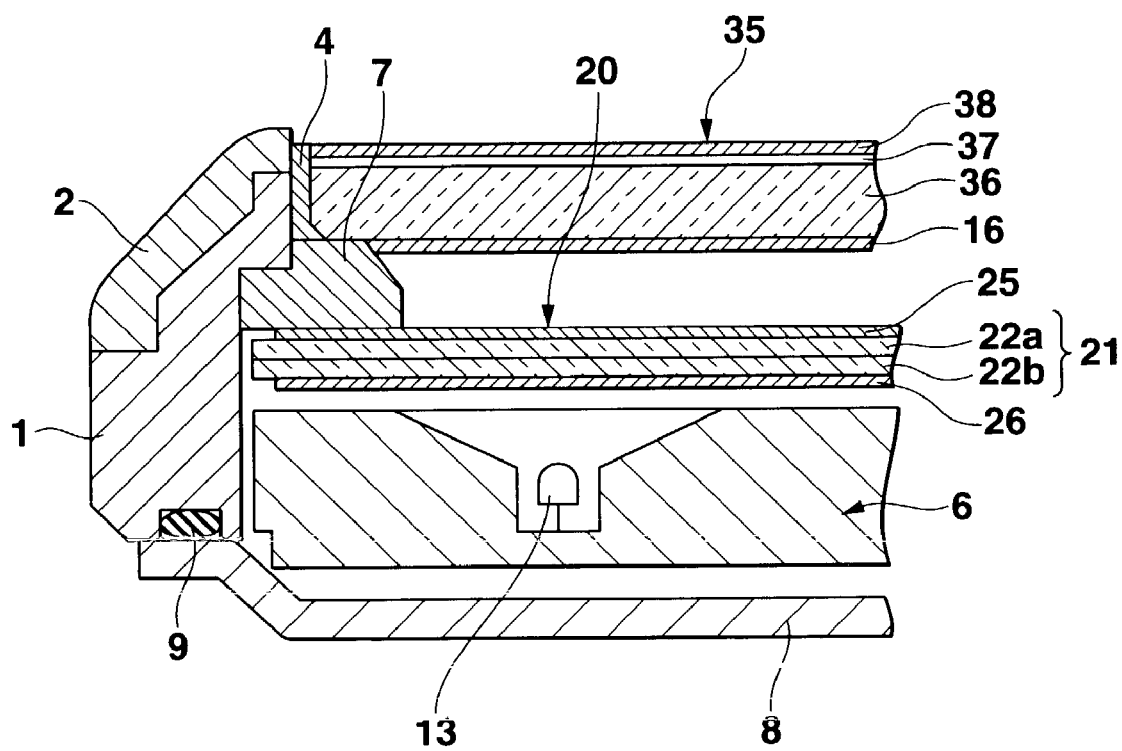
FIG. 15 is an enlarged cross-sectional view of a main portion of a wristwatch with a touch-in panel as an eighth embodiment.
Figure 16:
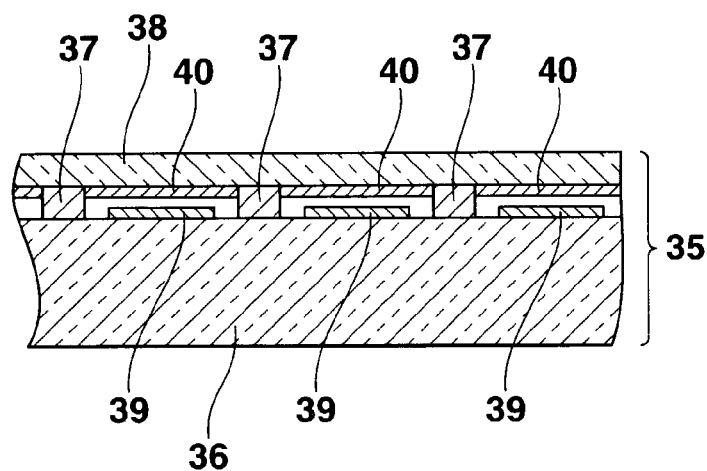
FIG. 16 is an enlarged cross-sectional view of a main portion of the touch-in panel of FIG. 15.

(8) Eighth Embodiment:

Referring to FIGS. 15 and 16, a wristwatch as an eighth embodiment will be described next. The same reference numeral is used to denote the same element of the eighth embodiment of FIGS. 15 and 16 and the third embodiment of FIG. 6.

This wristwatch has substantially the same structure as the third embodiment excluding that a transparent touch-in panel 35 is provided on an upper surface of the case 1 through a packing 4, as shown in FIG. 15.

As shown in FIG. 16, the touch-in panel 35 comprises a flexible transparent film 38 provided through spacers 37 on a transparent glass base 36, a plurality of transparent fixed contacts 39 each provided between spacers 37 on an upper surface of the glass base 36, and a like number of transparent movable contacts 40 each provided between spacers 37 on a lower surface of the film 38 opposite to the plurality of fixed contacts 39, respectively, in spaced relationship so that when the film 38 is pressed at a point from above, the film 38 bends to cause a relevant movable contact 40 to come into contact with a corresponding fixed contact 39 to thereby output a corresponding electric signal.

As shown in FIG. 15, luminescent layers 16 that react to UV rays to emit corresponding colored rays of light, and in an ordinary state in which they are irradiated with no UV rays, exhibit transparency are provided by printing or coating on a lower surface of the touch-in panel 35 or the glass base 36.

A liquid crystal display unit 20 having the same structure as in the third embodiment is provided below the touch-in panel 35 in a watch module 6 in the case 1. A UV ray emitting element 13 is provided under the liquid crystal display unit 20, as in the third embodiment.

According to this wristwatch, the luminescent layers 16 provided on the lower surface of the touch-in panel 35 are transparent, for example, in a bright place in a house which is irradiated with substantially no UV rays. Therefore, external light can be taken into the watch case 1 through the transparent touch-in panel 35. The external light taken then enters the liquid crystal display unit 20, so that information displayed on the liquid crystal display unit 20 can be visually recognized through the transparent luminescent layers 16 and the transparent touch-in panel 35. In addition, the user can touch in data through the transparent touch-in panel 35 while viewing the information displayed on the liquid crystal display unit 20.

When the UV ray emitting element 13 is caused to emit UV rays, these UV rays pass through the liquid crystal display unit 20 to thereby strike on the luminescent layers 16 provided on the lower surface of the touch-in panel 35 to thereby cause the transparent luminescent layers 16 to react to the UV rays to emit corresponding colored rays of light. Therefore, data can be inputted through the touch-in panel 35 on a background of the colored rays of light emitted by the luminescent layers 16. Thus, also in this wristwatch, the UV ray emitting element 13 provided below the display unit 20 can be caused to emit UV rays on demand to thereby cause the luminescent layers 16 to emit corresponding colored rays of light and hence to provide a highly colorful and very ornamental display, as in the third embodiment.

While in the eighth embodiment the luminescent layers 16 are illustrated as being provided on the lower surface of the glass base 36 of the transparent touch-in panel 35, the luminescent layers 16 may be provided, for example, on an upper surface of the transparent film 38. Also, this arrangement produces similar advantageous effects to those produced by the eighth embodiment. In addition, for example, as in the third embodiment of FIG 7, the luminescent layers 16 may be provided on the upper surface of the upper polarizing plate 25 of the liquid crystal display unit 20. Alternatively, the luminescent layer 16 may be provided on the upper or lower surface of the liquid crystal cell 21 or on the lower surface of the lower polarizing plate 26, as shown in the modifications of FIGS. 8A–8C. Since in this arrangement the luminescent layers 16 that react to UV rays to emit corresponding colored rays of light are provided on the lower surface of the touch-in panel 35 as in the eight embodiment, the luminescent layers 16 can fulfill a backlight function for the liquid crystal display unit 20 and the touch-in panel 35.

(9) Ninth Embodiment

Figure 17:
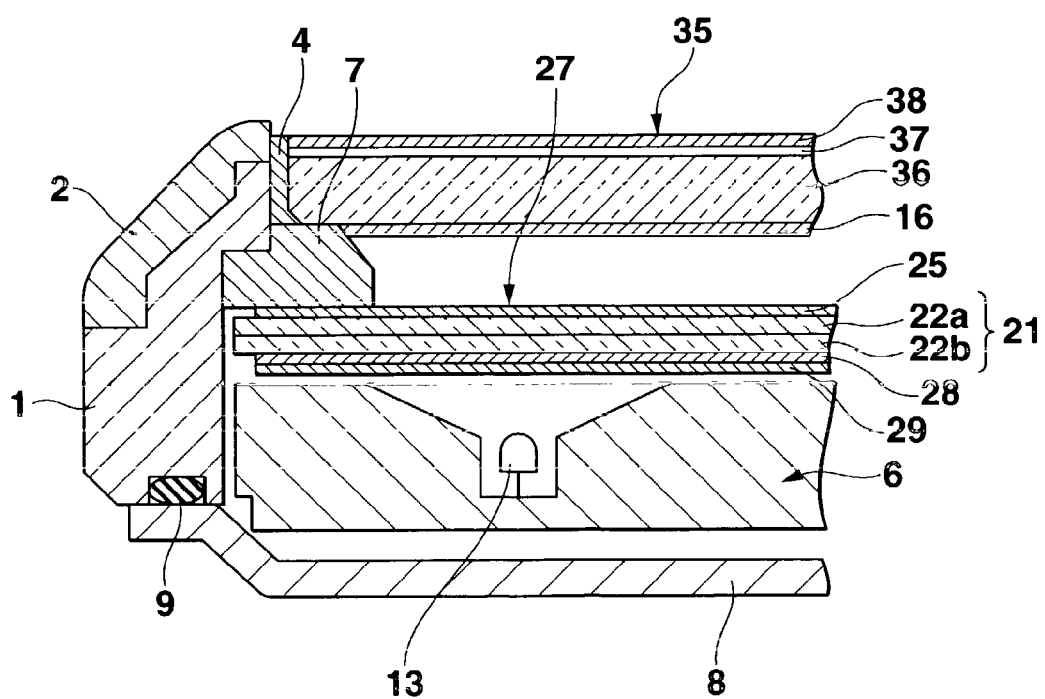
FIG. 17 is an enlarged cross-sectional view of a main portion of a wristwatch with a touch-in panel and a liquid crystal display unit using a semitransparent reflective plate as a ninth embodiment.

Referring to FIG. 17, a wristwatch as a ninth embodiment will be described next. The same reference numeral is used to identify the same element of the ninth embodiment of FIG. 17 and the eighth embodiment of FIGS. 15 and 16.

This wristwatch has substantially the same structure as the eighth embodiment excluding that it comprises a semitransparent reflective plate 29 provided on a lower surface of a transparent touch-in panel 35. In this case, luminescent layers 16 that react to UV rays to emit corresponding colored rays of light and in an ordinary state where they are irradiated with no UV rays, exhibit transparency are provided on a lower surface of the touch-in panel 35, or the glass base 36, as in the eighth embodiment.

As in the fifth embodiment, the liquid crystal display unit 27 comprises an upper polarizing plate 25 on an upper surface of a liquid crystal cell 21, a lower transparent polarizing plate 28 provided on a lower surface of the liquid crystal cell 21, and a semitransparent reflective plate 29 provided on a lower surface of the lower polarizing plate 28 so that a part, of external light that has passed through the touch-in panel 35, the transparent luminescent layer 16, the upper polarizing plate 25, the liquid crystal cell 21 and the lower polarizing plate 28 is reflected by the semitransparent reflective plate 29. Thus, the liquid crystal display unit 27 displays information depending on a state in which a voltage is selectively applied across the pair of electrodes 22a and 22b.

In this wristwatch, the luminescent layers 16 provided on the lower surface of the touch-in panel 35 are transparent, for example, in a bright place in a house that is irradiated with substantially no UV rays, as in the eighth embodiment. Thus, external light can be taken into the case 1 through the transparent touch-in panel 35 and the liquid crystal display unit 27, and a part of the entering external light is reflected by the semitransparent reflective plate 29. Thus, the user can visually recognize the information displayed on the liquid crystal display unit 27 through the transparent luminescent layers 16 and the transparent touch-in panel 35, and touch in data on the transparent touch-in panel 35 while viewing information displayed on the liquid crystal display unit 27.

When the UV ray emitting element 13 is caused to emit UV rays, these UV rays enter and then pass through the semitransparent reflective plate 29 and the liquid crystal display unit 27 to strike on the luminescent layers 16 provided on the lower surface of the touch-in panel 35. Thus, the transparent luminescent layers 16 react to the UV rays to emit corresponding colored rays of light. Therefore, the user can input data at the touch-in panel 35 on a background of the colored rays of light emitted by the luminescent layers 16 even in any of bright and dark places. Therefore, also in this wristwatch, the UV ray emitting element 13 can be caused to emit UV rays on demand to thereby cause the luminescent layers 16 to emit corresponding colored rays of light to provide a highly colorful and very ornamental display as in the eighth embodiment.

While in the ninth embodiment the luminescent layers 16 are illustrated as being provided on the lower surface of the glass base 36 of the transparent touch-in panel 35, the luminescent layers 16 may be provided on an upper surface of the transparent film 38. This arrangement also produces similar advantageous effects to those produced by the eighth embodiment. Alternatively, the luminescent layers 16 may be provided on an upper surface of the upper polarizing plate 25 of the liquid crystal display unit 20 as in the third embodiment of FIG. 7. Alternatively, the luminescent layers 16 may be provided on the upper or lower surface of the liquid crystal cell 21 or the lower surface of the lower polarizing plate 26 as in the respective modifications of FIGS. 8A–8C. Alternatively, the luminescent layers 16 may be provided on both the upper and lower surfaces of the semitransparent reflective plate 29 as in the fifth embodiment of FIG. 11 and its the modification of FIG. 12. In this arrangement, since the luminescent layers 16 that react to UV rays to emit corresponding colored rays of light are provided on the lower surface of the touch-in panel 35 as in the eighth embodiment, the luminescent layers 16 can fulfill a function of a backlight for the liquid crystal display unit 20 and the touch-in panel 35.

Figure 18:
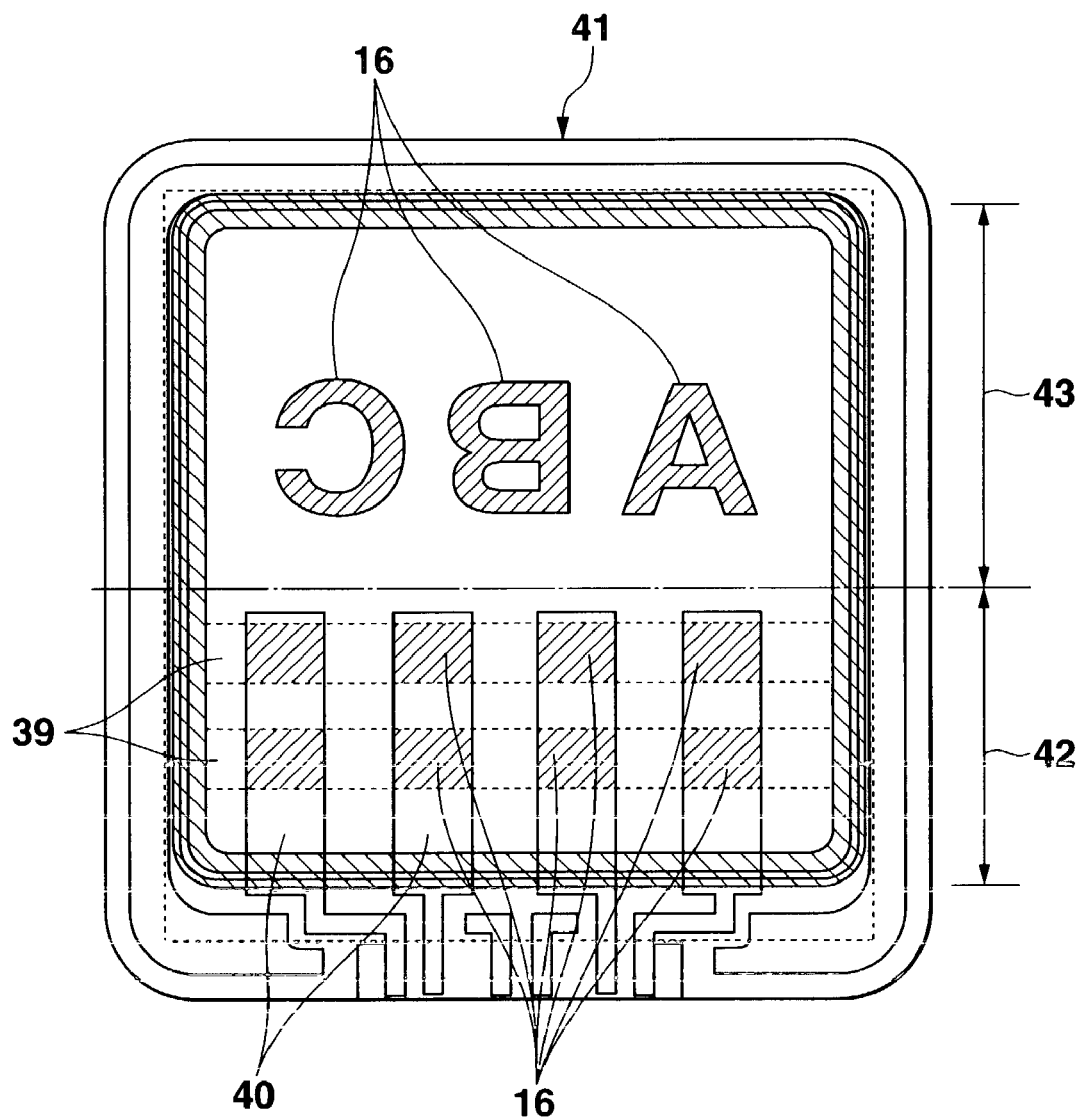
FIG. 18 is a back view of a touch-in panel of a wristwatch as a tenth embodiment.

(10) Tenth Embodiment:

Referring to FIG. 18, a wristwatch as a tenth embodiment will be described next. The same reference numeral is used to identify the same element of the embodiment of FIG. 18 and the eighth embodiment of FIGS. 15 and 16.

This wristwatch has substantially the same structure as the eighth embodiment excluding that a transparent touch-in panel 41 is made of an input area 42 and a transparent display area 43 provided on this side and the other side, respectively, and that luminescent layers 16 are provided at predetermined positions on the lower surface of the touch-in panel 41, as shown in FIG. 18. FIGS. 15 and 16 are also used as showing the present embodiment.

The input area 42 corresponds to the touch-in panel 35 of FIGS. 15 and 16. That is, in the input area 42 a flexible transparent film 38 is provided through spacers 37 on a glass base 36. A plurality of spaced transparent strip-like fixed contacts 39 each are provided between spacers 37 on an upper surface of the glass base 36 and a plurality of movable transparent strip-like movable contacts 40 each are provided between spacers 37 on a lower surface of the film 38 so as to intersect with the plurality of strip-like fixed contacts 39 at right angles. The areas where the plurality of strip-like fixed contacts 39 and the plurality of strip-like movable contacts 40 intersect compose the respective keys. The transparent display area 43 has a structure in which the transparent film 38 is provided on the glass base 36 through spacers 37. A plurality of luminescent layers 16 each taking the form of a mark such as a symbol or figure are provided in a matrix form on a lower surface of a portion of the glass base 36 corresponding to the input area 42 such that each luminescent layer 16 is at a position of a respective one of a plurality of the intersection areas.

This wristwatch produces similar advantageous effects to those produced by the eighth embodiment. In addition, especially, when the UV ray emitting element 13 provided below the liquid crystal display unit 20 is caused to emit UV rays, these UV rays strike on the respective luminescent layers 16 provided on the touch-in panel 41 through the liquid crystal display unit 20 to thereby cause the respective luminescent layers 16 to react to the UV rays to emit corresponding colored rays of light. Since the respective luminescent layers 16 correspond to the respective keys, the portions of the input area 42 corresponding to the positions of the respective keys emit corresponding colored rays of light or the same colored rays of light at this time. Therefore, even when the touch-in panel 41 is transparent, the respective keys can be visually recognized satisfactorily. Since the luminescent layers 16 provided on the transparent area 43 each take the form of a mark such as a symbol or a figure, the marks are caused to emit corresponding colored rays of light so as to be visually recognized satisfactorily.

While in the eighth-tenth embodiments and their modifications the liquid crystal display units 20 and 27 are illustrated as being provided on the lower sides of the touch-in panels 35 and 41, respectively, and the UV ray emitting elements 13 are illustrated as being provided on the respective lower sides of the liquid crystal display units 20 and 27, the liquid crystal display units 20 and 27 need not necessarily be provided. Instead, the UV ray emitting elements 13 may be provided below each of the touch-in panels 35 and 41 so that the UV rays emitted by the UV ray emitting elements 13 may strike directly on each of the touch-in panels 35 and 41. Also, in this case a diffuser plate (not shown) that diffuses the UV rays emitted by the UV ray emitting elements 13 and irradiates the lower overall surface of the liquid crystal display unit 20 with the emitted UV rays is preferably provided between the UV ray emitting element 13 and each of the touch-in panels 35 and 41.

Figure 19:
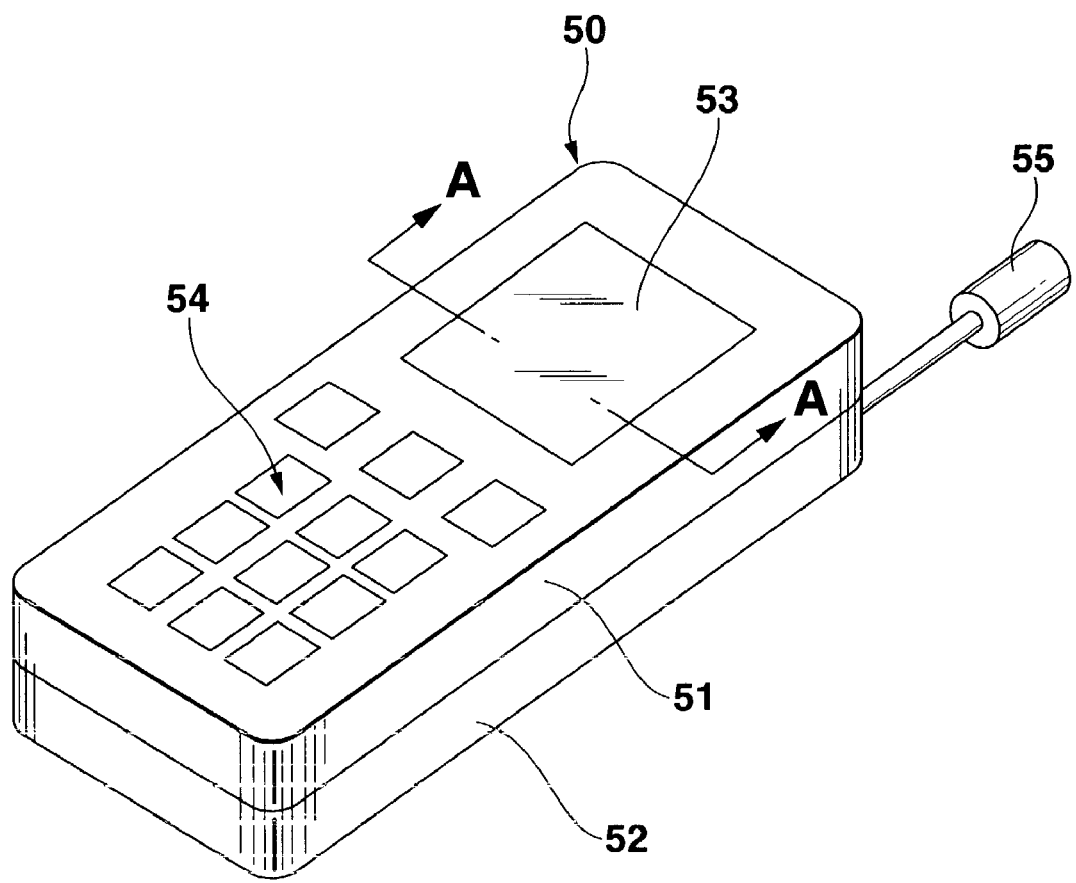
FIG. 19 is a perspective view of a portable telephone as an eleventh embodiment.
Figure 20:
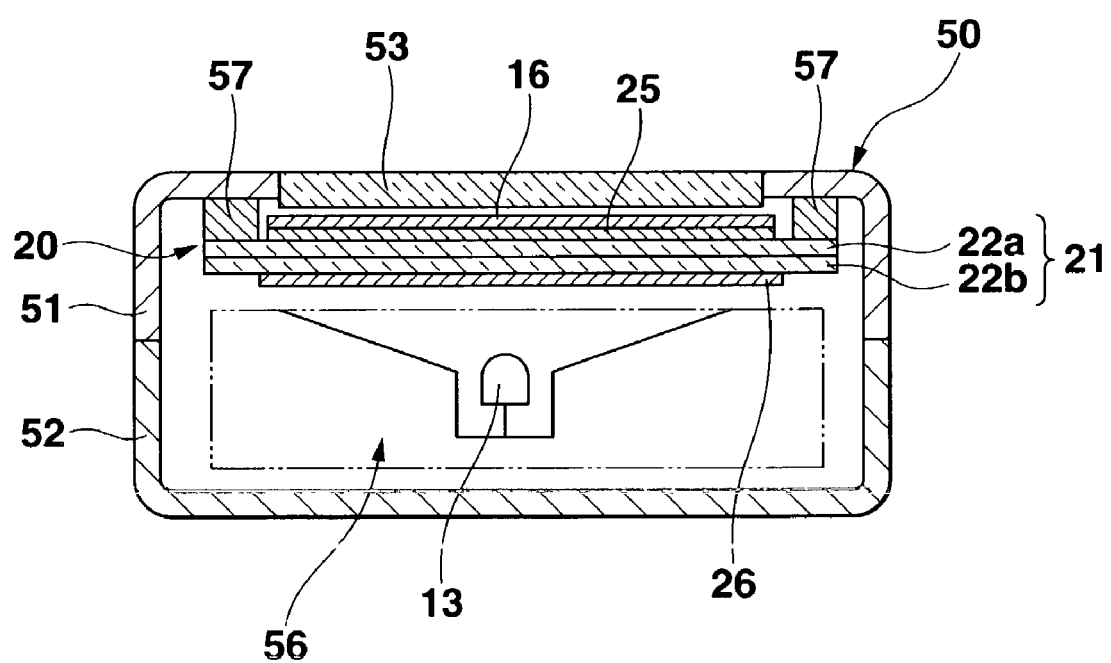
FIG. 20 is an enlarged cross-sectional view taken along a line A—A of FIG. 19.

(11) Eleventh Embodiment:

Referring to FIGS. 19 and 20, a portable telephone set as an eleventh embodiment will be described next.

FIG. 19 is a perspective view of the portable telephone. FIG. 20 is an enlarged cross-sectional view taken along a line A—A in FIG. 19. As shown in FIG. 19, the portable telephone includes a plastic case 50 composed of an upper case half 51 and a lower case half 52 joined to the upper case half.

The case 50, or upper case half 51, has protective glass 53 and a plurality of keypads 54 necessary for the telephone functions disposed on an upper surface of the upper case half 51, which has an extendable antenna 55 at its end.

As shown in FIG. 20, the case 50 contains a telephone module 56 having various parts such as a liquid crystal display unit 20 necessary for fulfilling a telephone function. As shown in FIG. 20, the liquid crystal display unit 20 has the same structure as that of the third embodiment and is disposed through a ring-like frame 57 under the transparent window 53. The liquid crystal display unit 20 comprises an upper polarizing plate 25, an underlying liquid crystal cell 21 that includes a pair of transparent electrodes 22a and 22b between which liquid crystal 23 is sealed with sealant 24, and a lower semitransparent polarizing plate 26 provided on a lower surface of the liquid crystal cell 21, as in the third embodiment.

As in the third embodiment, luminescent layers 16 that react to UV rays to emit corresponding colored rays of light and in an ordinary state where they are irradiated with no UV rays, exhibit transparency are provided by printing or coating on an upper surface of the upper polarizing plate 25 of the liquid crystal display unit 20. A UV ray emitting element 13 is provided below the liquid crystal display unit 20. A diffuser plate (not shown) is preferably provided between the liquid crystal display unit 20 and the UV ray emitting element 13 for uniformly diffusing the UV rays emitted by the UV ray emitting element 13 and irradiating the lower overall area of the liquid crystal display unit 20 with the diffused UV rays.

According to this portable telephone, external light enters through the protective glass 53, the transparent luminescent layers 16 and the upper polarizing plate 25 into the liquid crystal display cell 21, for example, in a bright place in a house which is irradiated with substantially no UV rays. A part of the external light having passed the liquid crystal cell 21 is reflected by the lower polarizing plate 26 to thereby allow information displayed on the liquid crystal display unit 20 to be visually recognized satisfactorily.

When the UV ray emitting element 13 is caused to emit UV rays, these UV rays pass through the lower polarizing plate 26, the liquid crystal cell 21 and the upper polarizing plate 25 provided on the upper surface of the liquid crystal display unit 20 to thereby strike on the luminescent layers 16. Thus, the transparent luminescent layers 16 are caused to react to the UV rays to thereby emit corresponding colored rays of light. Therefore, in this portable telephone, the UV ray emitting element 13 can be caused to emit UV rays on demand to thereby cause the luminescent layers 16 to emit corresponding colored rays of light and hence to provide a highly colorful and very ornamental display.

While in the eleventh embodiment the luminescent layers 16 are illustrated as being provided on the upper surface of the upper polarizing plate 25 which is, in turn, provided on the upper surface of the liquid crystal display unit 20, the luminescent layers 16 may be provided on the upper surface of the liquid crystal cell 21 as in the first modification of FIG. 8A or on the lower surface of the liquid crystal cell 21 as in the second modification of FIG. 8B or on the lower surface of the lower polarizing plate 26 as in the third modification of FIG. 8C. Alternatively, the luminescent layers 16 may be provided on each of the upper and lower surfaces of the semitransparent reflective plate 29 provided below the liquid crystal display unit 27 as in the fifth embodiment of FIG. 11 instead of the liquid crystal display unit 20. As just described above, when the luminescent layers 16 are provided below the liquid crystal cell 21, the portable telephone produces similar advantageous effects to those produced by the eleventh embodiment. In addition, when the luminescent layers 16 react to UV rays to thereby emit corresponding colored rays of light, they can also function as a backlight for the liquid crystal display unit 20.

While in the eleventh embodiment the UV ray emitting element 13 is illustrated as being provided below the liquid crystal display unit 20, the UV ray emitting element 13 may be provided instead in a recess provided in a ring-like spacer 57 as in the sixth embodiment of FIG. 13 to irradiate the liquid crystal display unit 30 obliquely downward with UV rays. Alternatively, as in the sixth embodiment an electroluminescent element 31 may be provided below the liquid crystal display unit 30 to irradiate the lower surface of the liquid crystal display unit 30. In this portable telephone, the UV ray emitting element 13 can be caused to emit UV rays on demand to thereby cause the luminescent layers 16 to emit corresponding colored rays of light. The electroluminescent element 31 can also be caused to emit corresponding colored rays of light from its flat surface so that information displayed on the liquid crystal display unit 30 may be visually recognized. When both the luminescent layers 16 and the electroluminescent element 31 are caused to emit corresponding colored rays of light, these colored rays of light are mixed to provide a more highly colorful and very ornamental display.

While in the eleventh embodiment the protective glass 53 is illustrated as being simply provided on the case 50, a dichroic mirror 17 as a wavelength selector that reflects UV rays and allows other rays of light to pass therethrough may be provided on the lower surface of the protective glass 53, for example, as in the fourth embodiment of FIG.9. In this arrangement, the UV rays emitted by the UV ray emitting element 13 are reflected by the dichroic mirror 17 without leaking through the protective glass 53 out of the case 50. Therefore, the luminescent layers 16 are irradiated more efficiently with the UV rays to thereby cause the luminescent layers 16 to emit corresponding colored rays of light more clearly.

While in the first-eleventh embodiments and their modifications the wristwatches and portable telephones are illustrated, the present invention may also be widely applicable to various electronic devices such as electronic notebooks, electronic dictionaries; portable terminals, personal computers, and printers, as well as other various devices such as meters for use in cars and/or parts of those devices.

In each of the first-fifth and eleventh embodiments of FIGS. 1–12, 19 and 20, the UV ray emitting apparatus has been described that comprises the optically transparent display unit (watch face 5 or liquid crystal display unit 20 or 27), the luminescent layers 16 provided on the display unit to react to UV rays and emit colored rays of light, and the UV ray emitting element 13 provided below the display unit for irradiating the display unit with the UV rays from below.

According to this UV ray emitting apparatus, the UV ray emitting element provided below the display unit can be caused to emit UV rays on demand to irradiate with UV rays the luminescent layers provided on the display unit to thereby cause the luminescent layers to emit various corresponding colored rays of light. Thus a highly colorful and very ornamental display is provided.

In this case, if the display unit is a watch face 5 including a transparent plastic disk 14 that diffuses UV rays emitted by the UV ray emitting element, the UV rays are diffused by the transparent plastic disk. Thus, the UV rays substantially uniformly strike on the luminescent layers provided on the watch face to thereby cause the luminescent layers to emit corresponding colored rays of light satisfactorily.

When the display unit comprises the liquid crystal display unit 20 or 27 comprising at least the liquid crystal cell 21 that includes the pair of upper and lower transparent electrodes 22a and 22b between which liquid crystal 23 is sealed, then upper polarizing plate 25 provided on the upper surface of the liquid crystal cell, and the lower polarizing plate 26 or 28 provided on the lower surface of the liquid crystal cell, the liquid crystal display unit can display information such as time as well as cause the UV ray emitting element to emit UV rays on demand to thereby cause the luminescent layers to emit corresponding various colored rays of light. Thus, the UV ray emitting element can be caused to emit UV rays on demand to thereby cause the luminescent layers to emit corresponding colored rays of light to provide a highly colorful and very ornamental display. If in the UV ray emitting apparatus the luminescent layers are provided on the lower surface of the liquid crystal cell of the liquid crystal display unit, on the lower surface of the lower polarizing plate provided on the lower surface of the liquid crystal display unit, or on the upper or lower surface of the semitransparent reflective plate provided below the lower polarizing plate that, in turn, is provided on the lower surface of the liquid crystal display unit, the colored rays of light emitted by the luminescent layers can fulfill a function of a backlight for the liquid crystal display unit because the luminescent layers are provided below the liquid crystal cell.

In the second and fourth embodiments of FIGS. 5 and 9, the UV ray emitting apparatus have been described that respectively comprise the optically transparent display units (watch face 5, liquid crystal display unit 20) the luminescent layers 16 provided on the display units for reacting to UV rays to emit corresponding colored rays of light, the UV ray emitting elements 13 provided below the display units to irradiate the display units with UV rays from below, the transparent covers (watch crystals 3) provided above the display units, and the wavelength selectors (dichroic mirrors 17) provided on the covers for reflecting UV rays and allowing other rays of light to pass therethrough.

According to each of these UV ray emitting apparatus, the UV ray emitting element can be caused to emit UV rays to thereby cause the luminescent layers to emit corresponding colored rays of light. Thus, a highly colorful and very ornamental display is provided. Especially, since the UV rays having passed the display unit are reflected by the wavelength selector on the cover to thereby strike again on the luminescent layers provided on the display unit. Therefore, this striking is efficient to thereby cause the luminescent layers to emit corresponding colored rays of light more satisfactorily.

In the sixth and seventh embodiments of FIGS. 13 and 14, the UV ray emitting apparatus have been described that each comprise the optically transparent display unit (liquid crystal display unit 30), the flat-surface light-emitting element (electroluminescent element 31) provided below the display unit to illuminate the display unit from blow, the luminescent layers 16 provided on the upper surface of the flat-surface light-emitting element for reacting to UV rays to emit corresponding colored rays of light, and the UV ray emitting element 13 provided than the outer periphery of the display unit at a higher position than the display unit for irradiating the display unit downward with UV rays.

According to this UV ray emitting apparatus, when the UV ray emitting element is caused to emit UV rays, these UV rays strike downward on the luminescent layers to cause the same to emit corresponding colored rays of light. In addition, the flat-surface light-emitting element can be caused to emit rays of light that strike on the display unit. Especially, when both the flat-surface light-emitting element and the UV ray emitting element are caused to emit rays of light simultaneously, both the rays of light emitted by the flat-surface light-emitting element and the rays of light emitted by the luminescent layers based on the UV rays emitted by the UV ray emitting element are mixed to thereby provide a highly colorful and very ornamental display.

In the eighth-tenth embodiments of FIGS. 15–18, the UV ray emitting apparatus have been described that each comprise the optically transparent touch-in element (touch-in panel 35), the luminescent layers provided on the touch-in element for reacting to UV rays to emit corresponding colored rays of light, and the UV ray emitting element 13 provided below the touch-in unit for irradiating the touch-in unit with UV rays from below.

According to this UV ray emitting apparatus, the UV ray emitting element can be caused to emit UV rays on demand to irradiate the touch-in element with the UV rays to thereby cause the luminescent layers to emit corresponding colored rays of light to provide a highly colorful and very ornamental display. Further, information can be input by touching the touch-in element.

In the third-eleventh embodiments of FIGS. 6–20, the luminescent layers 16 may be the ones that emit the same-colored rays of light or replaced with a single luminescent layer that emit single-colored rays of light.

What is claimed is:

1. An electronic apparatus comprising:
   a case having a crystal attached to an upper end thereof, the crystal having an upper surface and a lower surface;
   a watch module disposed within the case having an upper end and a lower end;
   an optically transparent dial plate disposed on the upper end of the watch module, the optically transparent dial plate having first and second sides;
   a plurality of indexes disposed at predetermined positions on the first side of the dial plate along its periphery;
   a UV ray emitting element disposed within the watch module for irradiating the second side of the optically transparent dial plate with UV rays;

a dichroic mirror provided on the whole lower surface of the crystal which reflects the UV rays irradiated by the UV ray emitting element and which enables other rays of light entering from the upper surface side of the crystal to pass therethrough; and luminescent materials disposed on the indexes for responding to the UV rays irradiated by the UV ray emitting element and reflected by the dichroic mirror, thereby passively becoming colored-luminous.

2. The electronic apparatus of claim 1, wherein:

the luminescent materials are disposed on respective upper surfaces of the indexes and are responsive to the UV rays irradiated by the UV ray emitting element, thereby becoming luminous in respective different colors.

* * * * *